Oct. 13, 1953     C. J. WALKER     2,655,014
FLEXIBLE COUPLING WITH THRUST LINK
Filed Nov. 17, 1951
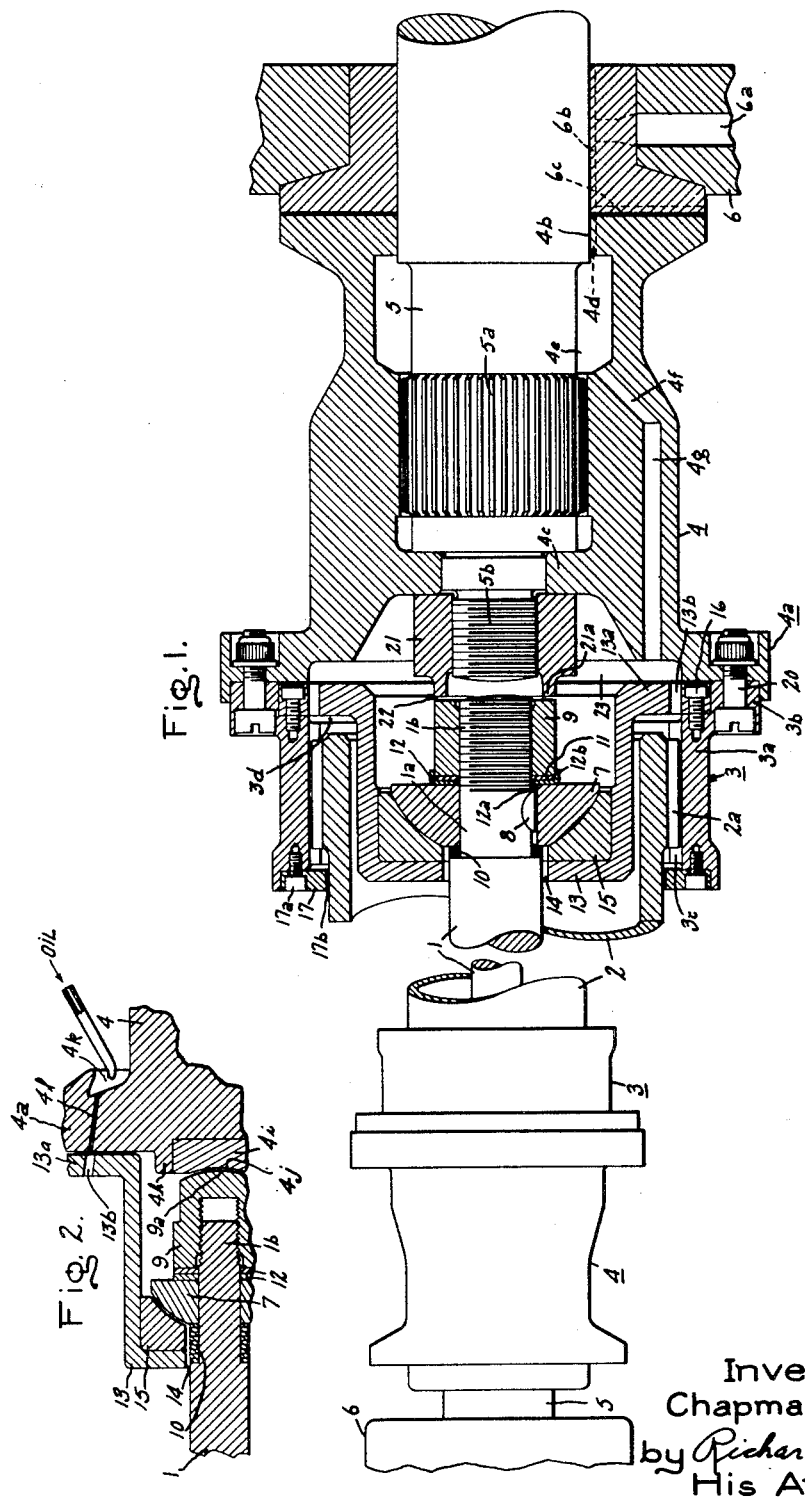
Inventor:
Chapman J. Walker,
by Richard E. Horley
His Attorney.

Patented Oct. 13, 1953

2,655,014

UNITED STATES PATENT OFFICE 2,655,014

FLEXIBLE COUPLING WITH THRUST LINK

Chapman J. Walker, Schenectady, N. Y., assignor to General Electric Company, a corporation of New York Application November 17, 1951, Serial No. 256,937

6 Claims. (Cl. 64—23)

1

This invention relates to a coupling assembly for connecting two axially spaced shafts which may be subject to a certain amount of angular and offset misalignment, particularly to such a coupling arrangement for connecting a turbine rotor to a compressor rotor in a gas turbine powerplant.

In large gas turbine powerplants, of capacities of 5,000 H. P. and larger, for public utility power generation, ship propulsion, or gas pipe-line pumping, it is convenient to make the turbine and compressor as separately assembled units, with a suitable coupling arrangement for driving the compressor rotor from the turbine rotor. In such plants, it is inevitable that there will be a certain amount of angular and/or offset misalignment between the compressor and turbine rotors. The coupling arrangement used must of course compensate for such misalignment without imposing stresses on the respective rotors. Because of the high speeds involved, the coupling must be light so that any eccentricity relative to the axis of rotation to which the coupling members may be subjected will not result in unbalanced loads sufficient to introduce serious vibration troubles. At the same time, the coupling must be strong enough to transmit the large torque loads with a substantial factor of safety and be simple in design so that the manufacture of the parts can be effected with great accuracy, to insure long life without trouble from vibration or excessive wear in the self-aligning parts of the coupling.

Accordingly, the purpose of the present invention is to provide an improved shaft coupling arrangement of the type described which is simple in design, light in construction, capable of transmitting large torque loads, and having components so simple that they can be accurately fabricated for long trouble-free life.

A further object is to provide a coupling assembly of the type described which can be assembled separately, then the complete coupling assembly interposed between the compressor and turbine rotors and readily secured to the ends of the respective shafts, without disturbing the axial location of the compressor or turbine rotors.

The present invention is a further improvement on the "torque-tube and connecting-rod type" of coupling disclosed in the copending application of Bruce O. Buckland and Chester S. Rice, Serial No. 208,961, filed February 1, 1951, and assigned to the same assignee as the present application.

Other objects and advantages will become apparent from the following description, taken in connection with the accompanying drawing, in which Fig. 1 represents a longitudinal view, partly in section, of a rotor coupling assembly incorporating the invention, and Fig. 2 is a detail view of one modification of a portion of the assembly.

Generally, the invention is practiced by providing a "connecting rod" assembly having end portions in thrust bearing relation with a pair of coupling sleeve assemblies and surrounded by a torque tube with splined ends in self-aligning torque-transmitting relation with the respective coupling sleeve assemblies. Special means are provided for adjusting the rotors axially relative to each other and for taking up wear in the thrust members.

Referring now more particularly to the drawing, the complete coupling assembly comprises a central connecting rod member 1 surrounded by a spaced torque tube 2, each end portion of which is connected by a coupling sleeve assembly 3 to a shaft coupling flange member indicated generally at 4. The coupling sleeve member 3 may be fabricated separately and secured to axially spaced rotor shafts 5 in a manner described more particularly hereinafter. One shaft 5 may be considered the end of a gas turbine rotor and the other the end of a compressor rotor. Each is provided with suitable bearings, indicated generally at 6.

For convenience in illustration, only the right-hand portion of the assembly is shown in section and to an enlarged scale, the left-hand half being shown in elevation and to a reduced size merely to indicate the relation between the coupling assembly and the rotors which it connects.

The connecting rod 1 is a simple straight cylindrical rod with a reduced end portion 1a having an extreme threaded end portion 1b. Retained on this reduced end portion is a hemispherical thrust member 7 which is prevented from rotating on shaft portion 1a by one or more key members 8. Thrust member 7 is locked in position by a retaining nut 9.

The thrust hemisphere 7 is provided with axial adjusting means in the form of a plurality of thin washers 10, and a second shim member 11 associated with a lockwasher 12. The shim means 11 may actually be one or more thin washers interposed between the lockwasher 12 and nut 9. The lockwasher 12 is provided with an inner circumferential portion projecting axially as indicated at 12a so as to enter the keyway containing key 8. Lockwasher 12 has an outer circumferential portion projecting radially beyond the circumference of nut 9 so that at one or more places on the circumference of washer 12 it may be peened into a notch or over a flat surface provided on nut 9, as indicated at 12b. It will be apparent that this arrangement prevents nut 9 from rotating on shaft thread 1b.

The torque tube member 2 is a simple straight cylindrical tube having a circumferential row of external spline teeth 2a at each end thereof. Since misalignment of the rotor shafts together with inaccuracies of machining may cause this torque tube to rotate about an axis eccentric to its center of gravity, it is made of as light a section as possible, consistent with the torque-transmitting capacity required, so that the unbalanced forces due to this eccentricity at high speeds will not introduce serious vibration troubles.

The coupling sleeve assembly 3 includes an outer cylindrical member 3a, and an internal cup member 13. The bottom of cup 13 is apertured so the connecting rod 1 can pass freely through with a substantial clearance at 14. Contained within cup member 13 is a separate thrust seat ring member 15 having a hemispherical surface adapted to engage the thrust hemisphere 7. The opposite end of cup member 13 is provided with a radially extending rim 13a. Cup rim portion 13a is received in an annular rabbet in the flanged end portion 3b of the coupling sleeve 3a, being retained in this rabbet by a plurality of circumferentially spaced machine screws 16.

The coupling sleeve portion 3a is provided with a circumferential row of internal spline teeth 3c, which as shown in the drawing are somewhat longer than the torque tube teeth 2a. The end of sleeve member 3a is provided with an oil dam ring member 17 which has a central aperture defining a small clearance space with the outer surface of torque tube 2 and is secured in a rabbet in the end of sleeve 3a by screws 17a. The principal function of this ring is to form a closure for the annular chamber 3d containing the spline teeth 2a, 3c, so that centrifugal force will maintain an annular body of oil in this chamber which completely submerges the wearing surfaces of the spline teeth. The radial thickness of this rotating body of oil will of course be determined by the size of the clearance space 17b. It will be seen that ring 17 must be fabricated in two or more arcuate segments in order to permit assembly as described hereinafter.

The radially extending flange 3b of the coupling assembly 3 is secured by a row of bolts 20 to a cooperating flange 4a of the shaft sleeve member 4. This sleeve member is supported in torque-transmitting relation to the shaft 5 by means of longitudinal spline teeth 5a. The shaft sleeve 4 is maintained concentric with shaft 5 by means of a first inner circumferential portion 4b fitting a cooperating cylindrical surface on shaft 5, and by a radially inwardly extending annular portion 4c which fits a smaller diameter end portion of shaft 5. Sleeve 4 is retained by means of a nut 21 fitting the threaded end portion 5b of the shaft. Shaft coupling sleeve members of this general arrangement are described more fully in the United States patent of Frank R. Harris, No. 2,611,632, issued September 23, 1952, and assigned to the same assignee as the present application.

It will be observed that the coupling sleeve lock-nut 21 has an axially projecting annular end portion 21a adapted to abut the adjacent end surface of the retaining nut 19, and ordinarily defining a small clearance space 22 therewith. Since in a gas turbine powerplant there will ordinarily be a tension load on the connecting rod 1, the thrust hemisphere 7 will ordinarily seat on its cooperating member 15, with the clearance 22 as shown in the drawing. However, under certain conditions, the tension load on connecting rod 1 may be relieved, whereupon the end portion 21a of lock nut 21 serves to prevent excessive axial movement of the connecting rod and torque tube assembly.

The above-described structure, as shown in Figure 1, represents the application of the invention to self-aligning couplings where the connecting rod is intended to be in tension only. However, the invention is also applicable to arrangements in which the connecting rod will be in compression some or all the time. The slight modification required to make the coupling adaptable to such service is illustrated in Figure 2. Those parts which are generally similar to corresponding parts shown in Figure 1 are indicated by like reference numbers. It will be observed that the difference in this structure is that the flanged end 4a of shaft 4 has a recessed portion 4h containing a thrust block 4i, which may be made of a suitable hardened steel. This thrust block is provided with a spherical surface 4j adapted to be engaged by a mating spherical surface 9a formed on the end of the connecting rod nut 9. The nut 9 is of course threaded onto the connecting rod thread 1b so as to provide appropriate working clearances between the spherical thrust surfaces 4j, 9a, and the other pair of cooperating thrust surfaces on members 7, 15. As indicated above in connection with Figure 1, the total amount of such clearance is determined by suitably dimensioning the shims 10, 12.

With this arrangement the connecting rod is positively positioned and is ready at all times to take load in either direction.

The method of assembly of this shaft coupling is as follows. First, of course, the respective turbine and compressor rotors will be installed and the shaft sleeve members 4 will be assembled to the shaft ends. The connecting rod-torque tube-coupling sleeve assembly is designed so as to be capable of assembly apart from the turbine and compressor rotors. First, one coupling sleeve assembly 3 (minus the segmental oil dam ring 17) will be secured to one end of the connecting rod 1 with appropriate shims and lockwashers 10, 11, 12 in place as shown in the drawing. The torque tube 2 is then assembled over the connecting rod 1 until the spline teeth 2a engage the teeth 3c in the coupling sleeve 3. The segmental oil dam ring 17 may now be assembled and secured by the machine screws 17a. The other coupling sleeve assembly 3 (minus its oil dam ring 17) is then slid over the other end of the connecting rod, with the spline teeth engaging, and the parts corresponding to the connecting rod retaining nut 9, hemisphere 7, seat 15, and washers and shims 10, 11, 12 are added.

The other segmental oil dam ring 17 can then be assembled.

It will be observed that the torque tube 2 simply "floats" on the respective end spline teeth, being free to move axially a limited amount by reason of the fact that the spline teeth 3c are substantially longer than the torque tube spline teeth 2a. This feature permits adjustment of the effective length of the coupling by adding to or subtracting from the shims 10, 12, with no other change to the coupling parts or assembly. The substantial degree of axial shifting thus permitted between the torque tube 2 and coupling sleeve assemblies 3 also serves to distribute the wear on the spline teeth. It performs an equally important function in permitting the coupling sleeve assemblies 3 to be moved axially towards each other on the torque tube so that the whole assembly can be inserted between the compressor and turbine shafts without changing the axial location of the rotors. With the coupling assembly interposed between the rotors, the sleeve assemblies 3 can then be moved axially toward the respective rotors so that the coupling flange 3b seats in the rabbeted recess defined in the adjacent face of coupling sleeve flange 4a. Adding the bolts 20 to the respective coupling flanges completes the assembly operation.

The lubrication system may be outlined briefly as follows. Oil at suitable pressure is supplied to a passage 6a in the righthand thrust bearing 6, which is provided with axial distributing grooves, one of which is indicated in dotted lines at 6b, and radial distributing grooves 6c for lubricating the thrust bearing end surface of sleeve 4. One or more axial grooves 4d conduct oil from the bearing to an annular recess 4e defined between the shaft coupling sleeve 4 and the shaft 5. From this recess oil passes through one or more axially and radially extending passages 4f to other axial passages 4g, thence to the central chamber 23 defined between the end surfaces of coupling sleeve member 4 and the cup member 13. In case the thrust bearing is not adjacent the coupling, or if the shaft flange 4a is an integral part of shaft 4, alternative methods of supplying oil to the chamber 23 are used. One such method is to introduce an oil jet into an annular inverted groove 4k in part 4a (Fig. 2), with one or more drilled holes 4l to lead the oil from the groove to the cooperating holes 13b in flange 13, thence to chamber 3d. As indicated above, the oil dam rings 17 serve to maintain a rotating annulus of oil in chamber 3d submerging the spline teeth. Excess oil leaks out through the clearance space 17b.

Thus it will be apparent that the invention provides an improved shaft coupling assembly in which the "torque transmitting function" is separated from the "axial locating function." The locating function is performed by a simple small diameter connecting rod which carries no torque, is readily adjustable in effective length, and is provided with self-aligning end fittings of simple construction yet designed to facilitate replacement of parts subject to wear and permitting adjustment of the clearances therebetween to compensate for wear. The torque transmitting function is performed by a comparatively small diameter tube of light weight and simple design, so that it is comparatively easy to fabricate and cheap to replace when wear on the spline teeth makes that necessary. The arrangement very effectively permits limited angular and offset misalignment between the compressor and turbine rotors, while positively locating one with respect to the other so that only one thrust bearing need be provided. Since in a gas turbine powerplant the axial thrust on the compressor rotor is normally in the opposite direction to that on the turbine rotor, with this arrangement the thrust bearing need be designed to withstand only the net difference between the compressor thrust and the turbine thrust. The connecting rod 1 of the coupling assembly is designed to carry the thrust of whichever rotor does not have a thrust bearing.

The arrangement is particularly advantageous in view of the ease of removing the coupling assembly for inspection, servicing, and replacement of parts as wear requires, without disturbing the compressor or turbine rotors. The adjustable length feature of the shaft coupling assembly also permits limited axial adjustment of the turbine rotor relative to the compressor rotor. This feature is particularly important when the turbine and compressor are installed on separate foundation means, since the axial spacing of the two machines would have to be adjusted with great accuracy if the length of the coupling were not adjustable.

Another advantage is the ease of separately assembling the connecting rod-torque tube subassembly and then installing the combination between the compressor and turbine rotors by a very simple operation. This greatly facilitates manufacturing, dynamic balancing, and testing of the shaft coupling assembly as an integral unit in the factory. This is important where it is necessary to furnish a replacement for powerplants previously sold.

While only two embodiments of the invention have been described specifically herein, it will be apparent to those skilled in the art that many modifications and substitutions of mechanical equivalents may be made. It is of course intended to cover by the appended claims all such changes as fall within the true spirit and scope of the invention.

What I claim as new and desire to secure by Letters Patent of the United States is:

1. In a shaft coupling assembly adapted to be interposed between axially spaced shaft end portions, the combination of a central axially extending connecting rod, a torque tube coaxially surrounding and radially spaced from the connecting rod, and a pair of coupling sleeve assemblies disposed over the connecting rod at the respective ends thereof; each coupling sleeve assembly comprising a cup member having a central opening disposed over the end of the connecting rod with the open end of the cup coaxially surrounding the end of the rod and having a radially extending rim portion, a spherical seat member disposed within the cup and having a central opening through which the end of the connecting rod projects freely; a hemispherical thrust member engaging said seat member and supported on a reduced diameter end portion of the connecting rod, means for securing said hemispherical thrust member comprising retainer nut means in threaded engagement with the extreme end portion of the connecting rod and having one end portion abutting the hemispherical thrust member, shim means disposed at either side of the hemispherical thrust member for effecting limited axial adjustment thereof on the connecting rod, the other end of the retainer nut defining a radially extending abutment surface adapted to define a small axial clearance space with an adjacent end surface of the adjacent shaft end portion, said coupling sleeve assembly including also an outer sleeve member having one circumferential end portion secured to the outer circumferential portion of said cup rim portion and extending axially toward the other coupling sleeve member in radially spaced relation with said cup member to define an annular space in which is disposed one end of the torque tube member, said torque tube end portion having a circumferential row of external spline teeth engaging cooperating internal splines in the outer sleeve member, the annular space between tube and outer sleeve being of sufficient axial length relative to the torque tube spline teeth that the tube is free to shift axially in said annular space, and oil dam ring means secured to the end of the outer sleeve member remote from said cup rim portion and projecting inwardly to define an axial clearance space between the end of the torque tube and the flange of the cup member, whereby said coupling sleeve assembly is free to slide axially a limited distance relative to the torque tube as determined by said axial clearance space.

2. A self-aligning shaft coupling assembly in accordance with claim 1 in which the axial dimensions of the outer sleeve members and cup members relative to the torque tube splines are such that both coupling sleeve assemblies may be moved axially towards each other a sufficient distance to disengage them from the adjacent shaft coupling flanges, whereby the shaft coupling assembly can be removed as a unit from between the spaced ends of the adjacent shaft coupling flanges.

3. In a shaft coupling assembly adapted to be interposed between axially spaced shaft end portions, the combination of a central axially extending connecting rod, a torque tube coaxially surrounding and radially spaced from the connecting rod, and a coupling sleeve assembly connecting one end portion of the connecting rod with the adjacent end of the torque tube, said coupling sleeve assembly comprising a cup member having a central opening disposed over the end of the connecting rod with the open end of the cup coaxially surrounding and spaced from the end of the rod and having a radially extending rim portion and a spherical seat member disposed within the cup and defining a spherical thrust seat concave towards the end of the connecting rod, a hemispherical thrust member adjustably secured to the end portion of the connecting rod and adapted to engage said seat member, the extreme end of the connecting rod assembly defining a radially extending surface adapted to form a small axial clearance space with an end surface of the adjacent shaft, said coupling sleeve assembly including also an outer sleeve member having one circumferential end portion secured to the outer circumferential portion of said cup rim and extending axially toward the other end of the connecting rod in radially spaced relation with said cup member to define an annular space in which is disposed the adjacent end of the torque tube, said torque tube end portion having a circumferential row of external spline teeth engaging cooperating internal splines in the outer sleeve member, the annular space between tube and sleeve being of sufficient axial length relative to the torque tube spline teeth that the tube is free to shift axially a limited amount in said annular space, and oil dam ring means on the end of the outer sleeve member remote from said cup rim and projecting radially inward to define an annular clearance space with the outer surface of the torque tube, whereby the torque tube is free to slide axially a limited distance relative to the coupling sleeve assembly for distributing the wear on the spline teeth.

4. A shaft coupling assembly in accordance with claim 3 and including means for supplying a lubricating liquid to the annular space defined between torque tube and outer sleeve and bounded at either end by the cup rim and oil dam ring respectively, whereby centrifugal force maintains the spline teeth submerged in an annular rotating body of lubricant.

5. In a self-aligning shaft coupling assembly adapted to connect axially spaced shaft end portions at least one of which has a radially extending coupling flange and a central radially extending abutment surface, a torque tube coaxially surrounding and radially spaced from a central axially extending connecting rod, and a coupling sleeve assembly including a cup member having a central opening disposed over the end of the connecting rod with the open end of the cup coaxially surrounding the end of the rod and having a radially extending rim portion, self-aligning connecting means disposed within the cup and connected to the shaft end portion whereby the cup member is positively located in an axial direction relative to the connecting rod, the connecting rod end assembly including an end abutment surface adapted to define normally a small axial clearance with said central abutment surface of the shaft end portion, the coupling sleeve assembly including also an outer sleeve member having one circumferential end portion secured to said cup rim portion and to the outer circumferential portion of the shaft coupling flange and extending axially away therefrom in radially spaced relation with the cup member to define an annular space in which is disposed the adjacent end of the torque tube, said torque tube end portion having a circumferential row of external spline teeth engaging cooperating internal splines in the outer sleeve member, the annular space between tube and outer sleeve being of sufficient axial length relative to the torque tube splines that the tube is free to shift axially a limited distance, and ring means secured to the end of the outer sleeve member remote from the cup rim and projecting radially inward to define a clearance space with the outer surface of the torque tube.

6. In a self-aligning shaft coupling assembly adapted to connect axially spaced shaft end portions at least one of which has a radially extending coupling flange, a central axially extending connecting rod, a torque tube coaxially surrounding and radially spaced from the connecting rod, and a coupling sleeve assembly connecting adjacent ends of the torque tube and the connecting rod and including a cup member having a central opening disposed over the end of the connecting rod with the open end of the cup coaxially surrounding the end of the rod and having a radially extending rim portion secured to said adjacent shaft coupling flange, self-aligning connecting means disposed within the cup and connected to the end portion of the connecting rod for locating the cup axially on the rod, said coupling sleeve assembly including also an outer sleeve member having one circumferential end portion secured to the outer circumferential portion of the shaft coupling flange and to said cup rim portion, said outer sleeve member extending axially away from said shaft coupling flange in radially spaced relation with the cup member to define an annular space in which is disposed the adjacent end of the torque tube, said torque tube end portion having a circumferential row of external spline teeth engaging cooperating internal splines in the outer sleeve member, the annular space between tube and outer sleeve being of sufficient axial length relative to the torque tube splines that the tube is free to shift axially a limited amount in said annular space.

CHAPMAN J. WALKER.

References Cited in the file of this patent

UNITED STATES PATENTS

| Number | Name | Date |
|---|---|---|
| 2,035,171 | Loewus | Mar. 24, 1936 |
| 2,439,195 | Witmyer | Apr. 6, 1948 |
| 2,510,414 | Philbrick | June 6, 1950 |
| 2,551,437 | Jeffus | May 1, 1951 |

FOREIGN PATENTS

| Number | Country | Date |
|---|---|---|
| 615,881 | Germany | 1935 |